United States Patent
Foltin (10) Patent No.: US 9,789,809 B2
(45) Date of Patent: Oct. 17, 2017

(54) METHOD AND DEVICE FOR ALIGNING AN ILLUMINATED AREA OF A HEADLIGHT OF A VEHICLE AS A FUNCTION OF THE SURROUNDINGS OF THE VEHICLE

(71) Applicant: Robert Bosch GmbH, Stuttgart (DE)

(72) Inventor: Johannes Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 55 days.

(21) Appl. No.: 14/807,258

(22) Filed: Jul. 23, 2015

(65) Prior Publication Data
US 2016/0023592 A1    Jan. 28, 2016

(30) Foreign Application Priority Data
Jul. 25, 2014    (DE) .................... 10 2014 214 649

(51) Int. Cl.
*B60Q 1/14*    (2006.01)
*B60Q 1/08*    (2006.01)

(52) U.S. Cl.
CPC ............. *B60Q 1/143* (2013.01); *B60Q 1/08* (2013.01); *B60Q 1/085* (2013.01); *B60Q 2300/056* (2013.01)

(58) Field of Classification Search
None
See application file for complete search history.

(56) References Cited

U.S. PATENT DOCUMENTS

| | | | | |
|---|---|---|---|---|
| 7,204,620 B2* | 4/2007 | Yamamoto | ............... | B60Q 1/12 362/418 |
| 7,374,320 B2* | 5/2008 | Horii | ................. | B60Q 1/12 315/82 |
| 8,019,512 B2* | 9/2011 | Kamioka | ............... | B60Q 1/085 701/300 |
| 8,120,652 B2* | 2/2012 | Bechtel | ................ | B60Q 1/1423 348/113 |
| 8,562,192 B2* | 10/2013 | Tatara | ................. | B60Q 1/12 362/509 |
| 8,738,236 B2* | 5/2014 | Moizard | ................. | B60Q 1/12 362/466 |
| 9,381,852 B2* | 7/2016 | Foltin | ................ | G06K 9/00825 |
| 2014/0015411 A1* | 1/2014 | Ehlgen | ................. | B60Q 1/143 315/82 |
| 2014/0334168 A1* | 11/2014 | Ehlgen | ................. | B60Q 1/085 362/466 |

* cited by examiner

Primary Examiner — Redhwan K Mawari
Assistant Examiner — Edward Torchinsky
(74) Attorney, Agent, or Firm — Norton Rose Fulbright US LLP; Gerard Messina (57) ABSTRACT

A method for aligning an illuminated area of a headlight of a vehicle as a function of the surroundings of the vehicle, includes classifying at least one other vehicle in the surroundings of the vehicle as a function of a piece of information concerning a position of the other vehicle in relation to the vehicle, determining a target position of the headlight, with disregard of the other vehicle, when the other vehicle is classified as passing the vehicle or as being passed by the vehicle, and providing a signal for moving the headlight into the target position while the vehicle is being passed by the other vehicle or is passing the other vehicle.

18 Claims, 7 Drawing Sheets

METHOD AND DEVICE FOR ALIGNING AN ILLUMINATED AREA OF A HEADLIGHT OF A VEHICLE AS A FUNCTION OF THE SURROUNDINGS OF THE VEHICLE

RELATED APPLICATION INFORMATION

The present application claims priority to and the benefit of German patent application no. 10 2014 214 649.6, which was filed in Germany on Jul. 25, 2014, the disclosure of which is incorporated herein by reference.

FIELD OF THE INVENTION

The present invention relates to a method for aligning an illuminated area of a headlight of a vehicle as a function of the surroundings of the vehicle, a corresponding device, and a corresponding computer program.

BACKGROUND INFORMATION

Recent high beam assistance systems adapt the light distribution to the ambient situation. The typical high beam assist (HBA) automatically switches over between low-beam light and high-beam light, and adaptive systems dynamically adapt the light distribution to the traffic situation. The adaptive systems include, for example, adaptive high beam control (AHC), also known as adaptive cut-off line (aCOL) in the literature, or adaptive light-dark cutoff line, which, similar to the self-leveling headlight system, raises the light-dark cutoff line of the headlight just high enough so that the other road users are not blinded.

Continuous high beam control (CHC), also known in the literature as vertical cut-off line (vCOL), generates a light distribution which is similar to high-beam light, whereby a shared shadow corridor is generated around road users or groups of road users in order to shield them in a targeted manner. The so-called "matrix beam" or the "pixel light" has more degrees of freedom, and in principle may generate an individual shadow corridor for each road user. In addition, it is possible, based on information concerning the surroundings, to switch on specific static light distributions such as city light, expressway light, or rural roadway light.

SUMMARY OF THE INVENTION

Against this background, with the approach provided here, a method for aligning an illuminated area of a headlight of a vehicle as a function of the surroundings of the vehicle, a device which uses this method, and lastly, a corresponding computer program, according to the main claims are provided. Advantageous embodiments result from the respective subclaims and the following description.

Pivoting the headlight or headlights of a vehicle to a new target position even before another vehicle, which at that moment is next to the vehicle, has passed by the vehicle or has been passed by the vehicle makes it possible, in consideration of the inertia of the headlight movement, to switch over the headlight early to the optimal light distribution.

The driver of the vehicle may thus be provided with more light in the traffic area, for example by early pivoting of the headlight, which increases driving comfort. In addition, important information, such as an animal on the roadside, may be available to the driver more quickly. With an earlier light distribution of the headlight, which is likewise achievable according to the provided approach, a large number of changes in the light distribution relative to the travel direction, necessary for optimal illumination, which could possibly be bothersome to the driver may be reduced. Hectic changes in the light distribution may be avoided. The light distribution may be changed more quickly overall, so that the driver has the light distribution at the necessary location particularly promptly after passing another vehicle.

A method for aligning an illuminated area of a headlight of a vehicle as a function of the surroundings of the vehicle is provided, the method including the following tasks:

classifying at least one other vehicle in the surroundings of the vehicle as a function of a piece of information concerning a position of the other vehicle in relation to the vehicle;

determining a target position of the headlight, with disregard of the other vehicle, when the other vehicle is classified as passing the vehicle or as being passed by the vehicle; and providing a signal for moving the headlight into the target position while the vehicle is being passed by the other vehicle or is passing the other vehicle.

The headlight may be a front headlight. The vehicle may be a road-bound vehicle such as a motorcycle, or a passenger vehicle or a truck. In the case of a passenger vehicle or a truck as the vehicle, the headlight may be one of two headlights on the front end of the vehicle. The illuminated area may be an area in the vicinity of the vehicle which is illuminated by the headlight. In general, this area will extend at the widest point ahead of the vehicle, and to a lesser extent at the sides of the vehicle. The illuminated area may have the shape of a cone. The surroundings of the vehicle may denote an area around the vehicle which corresponds in size to a maximum illumination range of the headlight. One reason for aligning the illuminated area may be to avoid blinding the driver of another oncoming or preceding vehicle by the headlight. For this purpose, the illuminated area may be varied in different ways. For example, the illuminated area may be displaced by pivoting the headlight horizontally and/or vertically. Additionally or alternatively, a light distribution of the light emitted from the headlight may be changed. As the result of an optimal alignment of the illuminated area of the headlight, a shadow area may exist around an oncoming vehicle, for example, and an area of the surroundings next to the shadow area which is free of vehicles may be maximally illuminated by the headlight. "With disregard of the other vehicle when determining the target position of the headlight" may be understood to mean that the target position of the headlight is determined independently of the other vehicle. In this case, the determination takes place as if the other vehicle had not been recognized or had not even been in the surroundings of the vehicle. However, such a determination of the target position takes place only when the other vehicle (for example, as an oncoming road user) has passed the vehicle, or when the vehicle has overtaken the other vehicle.

The other vehicle may be an additional road user in the form of an additional motorcycle or an additional passenger vehicle or truck. The classification of the other vehicle may be understood to mean the assignment of the other vehicle to one of multiple classes, whereby each class may be characterized by a certain geographical position or a certain group of geographical positions in relation to the vehicle. The information concerning the position of the other vehicle may be sensor data. Data of the surroundings of the vehicle may be used for determining the target position of the headlight. The target position of the headlight may be understood to mean a rotational position of the headlight with respect to the chassis of the vehicle. Instead of the target position, a target angle may be used to adjust the headlight in order to establish the illuminated area of the headlight. The other vehicle passing the vehicle may be a so-called "passer-by," i.e., another vehicle which drives past the vehicle in the opposite lane in the direction opposite a travel direction of the vehicle. The other vehicle which is passed by the vehicle may be another vehicle which is being overtaken by the vehicle. The signal may be provided, for example, at an interface of an electric motor which is integrated into the vehicle. The task of the electric motor may be to move the headlight into the target position. Passing of the vehicle by the other vehicle, or the other vehicle being passed by the vehicle, may be characterized in that a side area of the vehicle facing the other vehicle, and a further side area of the other vehicle facing the vehicle, at least partially overlap.

In particular, the target position of the headlight may be determined in the step of determining, using a piece of information concerning a position of an additional other vehicle. The additional other vehicle may be classified as an oncoming vehicle or as a preceding vehicle in the step of classifying. With this specific embodiment, at an early point in time an optimal target position for the headlight may already be found in which the best possible illumination of the surroundings, in particular with few changes, is accompanied by a best possible avoidance of blinding the driver of the additional other vehicle.

For example, the additional other vehicle may be classified as an oncoming vehicle or a preceding vehicle in the step of classifying when a distance to be measured in the travel direction of the vehicle, between the vehicle and the additional other vehicle, is above a predefined distance threshold value. The additional other vehicle may thus be classified at low cost involving little computing effort.

For an even more accurate assignment of the additional other vehicle, the additional other vehicle may be classified as an oncoming vehicle in the step of classifying when its position in the travel direction of the vehicle is to the left of the vehicle in right-hand traffic, or is to the right of the vehicle in left-hand traffic. Alternatively, the additional other vehicle may be classified as a preceding vehicle when its position in the travel direction of the vehicle is in alignment with a position of the vehicle. This specific embodiment of the method, in particular when surroundings sensors of the vehicle are used, provides a simple, inexpensive option for a robust position determination of the additional other vehicle.

According to another specific embodiment, the target position of the headlight may be determined in the step of determining, based on an evaluation of the surroundings of the vehicle using surroundings data, when the surroundings are free of additional other vehicles. The illumination of the travel surroundings may thus advantageously be adapted to the particular features of these surroundings. For example, driving through the forest requires a different illumination of surroundings than does driving through a developed area. With this specific embodiment of the method, also when there are no additional other vehicles in the surroundings of the vehicle, the illuminated area of the headlight may be optimally adapted to an instantaneous driving situation.

For example, the method may include a step of reading in the information concerning a position of the other vehicle and/or the information concerning a position of an additional other vehicle and/or the data from a surroundings sensor of the vehicle.

The surroundings sensor may be, for example, an optical sensor of a camera of the vehicle which is directed toward the surroundings. The surroundings of the vehicle, including other vehicles which may be present, may thus be classified in a particularly rapid, reliable, and unambiguous manner. In addition, the method may be implemented inexpensively, since many vehicles are already equipped with a surroundings sensor as a standard feature.

Alternatively or additionally, when there are no additional other vehicles in the surroundings of the vehicle, the target position of the headlight may be determined in the step of determining, using a piece of information concerning a trajectory of the vehicle. With an illumination of vehicle surroundings as a function of the trajectory, it may be easily and quickly ascertained whether the best possible illumination is likely to be necessary, and where the appearance of additional other vehicles is to be expected in the near future.

In addition to ascertaining the trajectory with the surroundings sensor which is used for detecting the other vehicles, alternatively or additionally the trajectory may be ascertained with at least one additional sensor. An additional surroundings sensor may utilize a piece of navigation information which is based, for example, on the use of satellites or radio cells for position determination together with a piece of map information. The trajectory may advantageously be ascertained from the map information together with the position.

Another specific embodiment is the determination of the position and/or trajectory with the aid of Car-2-X communication; i.e., the vehicle receives information from another vehicle or from an infrastructure.

A trajectory may be ascertained, for example, using an inertial sensor such as a steering angle sensor and/or yaw rate sensor together with a speed signal. In the embodiment, it is advantageous that these sensors are already installed in the vehicle as a standard feature via vehicle stability control systems.

In addition, when there are no additional other vehicles in the surroundings of the vehicle, the target position may be determined to be in alignment with a center of the headlight in the step of determining. Computing time may advantageously be saved with a simple straight-ahead alignment of the headlight.

In particular, the target position of the headlight may be determined in the step of determining when the headlight is in a low-beam mode in relation to the other vehicle. The low-beam mode of the headlight may be understood to mean that the headlight emits low-beam light. Alternatively or additionally, the low-beam mode may constitute a change in the light distribution, in particular a switchover into a flat light distribution. With this specific embodiment, a particularly early adaptation of the headlight illumination to imminent traffic situations may be made possible. The illuminated area of the headlight may thus be set particularly precisely to the instantaneous travel surroundings.

In addition, a device for aligning an illuminated area of a headlight of a vehicle as a function of the surroundings of the vehicle is provided, the device including the following features:

a classification device for classifying at least one other vehicle in the surroundings of the vehicle as a function of a piece of information concerning a position of the other vehicle in relation to the vehicle;

a determination device for determining a target position of the headlight, the determination device being configured for carrying out the determination with disregard of the other vehicle (or independently of the other vehicle) when the other vehicle is classified as passing the vehicle or as being passed by the vehicle (i.e., when the vehicle is passing the other vehicle); and a provision device for providing a signal for moving the headlight into the target position while the vehicle is being passed by the other vehicle or is passing the other vehicle.

The object underlying the present invention may also be quickly and efficiently achieved by this embodiment variant of the present invention in the form of a device. The device may be coupled to the headlight of the vehicle or may be part of a central control unit of the vehicle, and may be configured for carrying out, controlling, or implementing the steps of a variant of a method provided here in its corresponding devices. The object underlying the present invention may also be quickly and efficiently achieved by this embodiment variant of the present invention in the form of a device.

In the present context, a device may be understood to mean an electrical device which processes sensor signals and outputs control and/or data signals as a function thereof. The device may have an interface which may have a hardware and/or software design. In a hardware design, the interfaces may be part of a so-called system ASIC, for example, which contains various functions of the device. However, it is also possible for the interfaces to be dedicated, integrated circuits, or to be at least partially composed of discrete components. In a software design, the interfaces may be software modules which are present on a microcontroller, for example, in addition to other software modules.

Also advantageous is a computer program product or a computer program having program code which may be stored on a machine-readable carrier or memory medium such as a semiconductor memory, a hard disk, or an optical memory, and used for carrying out, implementing, and/or controlling the steps of the method according to one of the above-described specific embodiments, in particular when the program product or program is executed on a computer or a device.

The approach provided here is explained in greater detail below as an example, with reference to the appended drawings.

DETAILED DESCRIPTION

In the following description of advantageous exemplary embodiments of the present invention, identical or similar reference numerals are used for the elements having a similar action which are illustrated in the various figures, and a repeated description of these elements is dispensed with.

Figure 1:
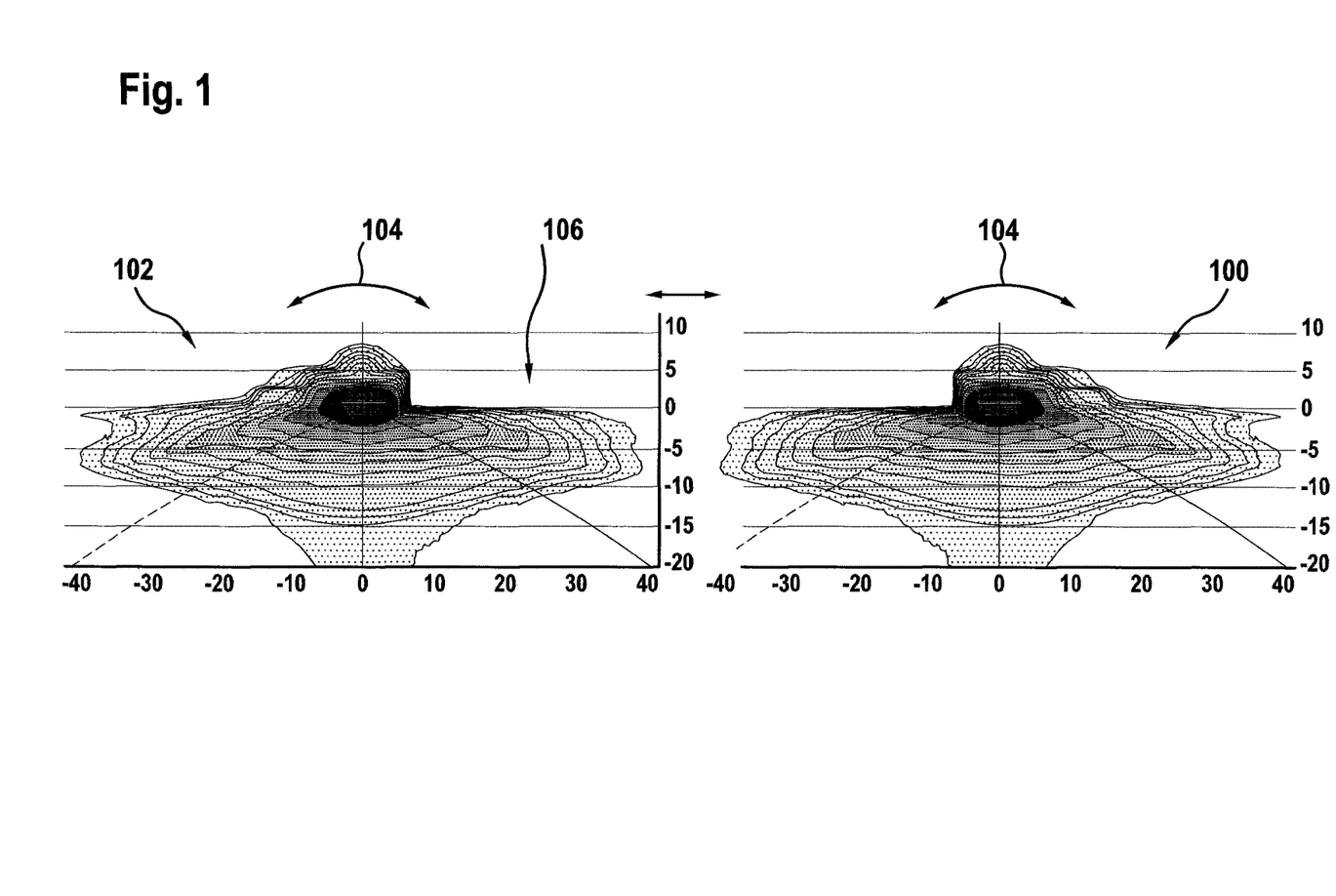
FIG. 1 shows a diagram of an example of a light distribution of a right and a left headlight.

FIG. 1, with reference to a double diagram, shows an example of a light distribution of a right and a left headlight of a vehicle for glare-free high-beam light. The double diagram shows the light distribution of the headlights on a measuring screen. The right half of the diagram shows a first light distribution 100 of a right headlight, and the left half of the diagram shows a second light distribution 102 of a left headlight, for glare-free high-beam light.

For glare-free high-beam light, generally only a single shadow area in a U shape is generated, which is to encompass all road users. The U shape may be computed, for example, in such a way that a surrounding rectangle, a so-called "bounding box," is placed around all vehicles, and this rectangle, which is provided with an offset, has been used as the target angle. The shadow area may be generated by superimposing light distributions 100, 102 from the left and right headlights and simultaneously pivoting the headlights away from one another. For example, a target angle is specified at the headlights which is to be implemented by the headlights with a suitable rotational motion 104. The angle specification describes a U shape 106, clearly apparent in the double diagram, which is defined by a left, right, and bottom shadow border.

When a vehicle is passed, a change from U shape 106 into an L shape (not shown in the illustration) takes place. The same applies for vehicles which drive past the host vehicle. This is achieved in that a headlight emits a flat light distribution, for example low-beam light. In this case, an L light distribution is obtained by superimposition of light distributions 100, 102.

When the glare-free high-beam light or the position of shadow 106 is achieved by pivoting the headlights (which, however, is generally not the case for matrix beam headlights), the headlight then pivots outwardly as far as possible to form a large shadow area 106 before the light distribution is switched over in order to still bring light into the traffic area for as long as possible.

Figure 2:
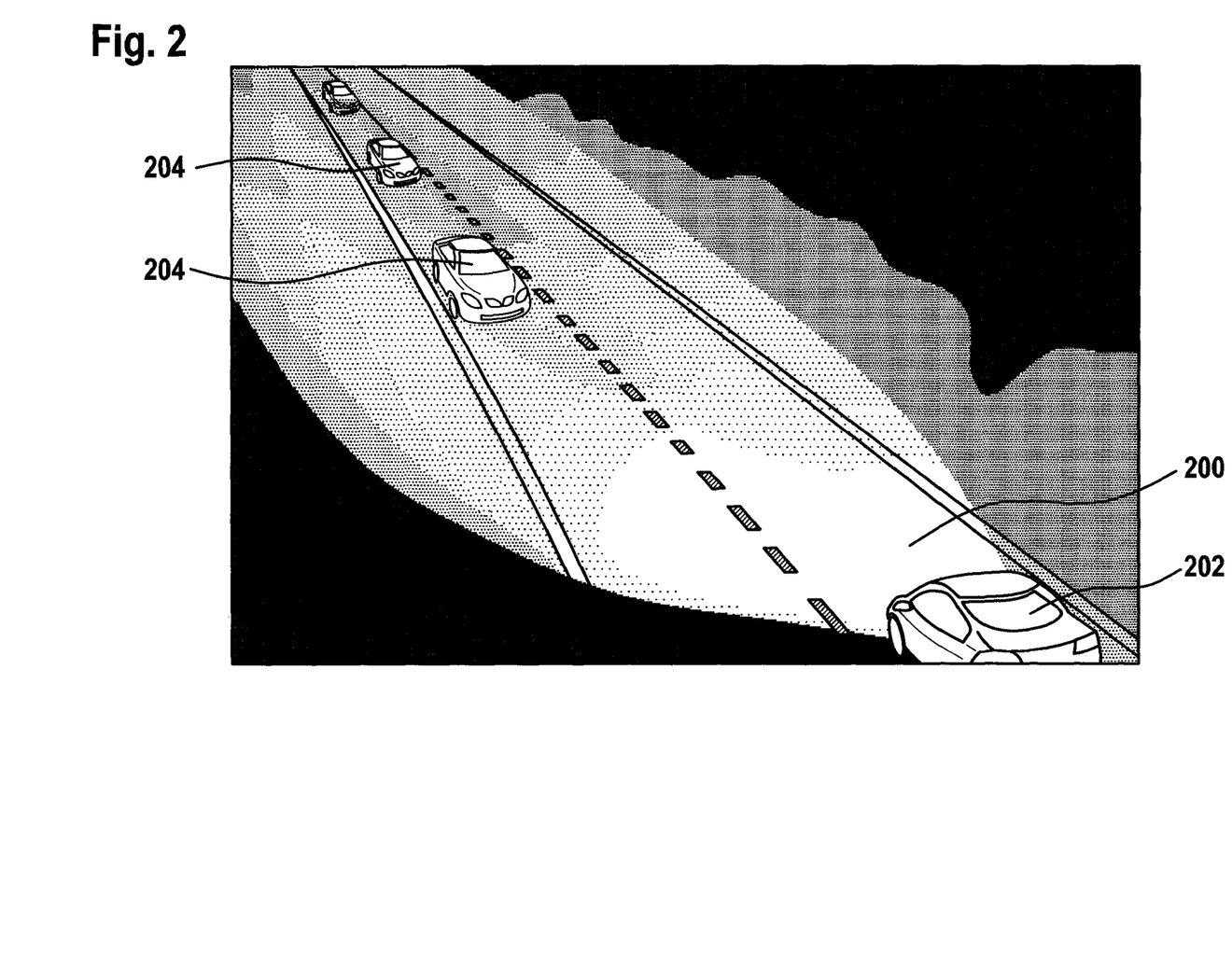
FIG. 2 shows a perspective illustration of an example of a passer-by situation.

FIG. 2 shows a perspective illustration of an example of a passer-by situation. An encounter situation of vehicles on a roadway is shown in a bird's-eye view. An illuminated area 200 of headlights of a vehicle 202 strikes oncoming vehicles 204. The left section of illuminated area 200 must be dimmed when oncoming vehicles 204 pass by. The U shape of light distribution 200 becomes an L shape by dimming the left headlight of vehicle 202.

Due to the inertia of the headlights, they cannot immediately switch over to the optimal light distribution after oncoming vehicles 204 have passed by vehicle 202. Either the headlight of vehicle 202 initially pivots into the new target position (for example, a new vehicle) and then switches over from an L light distribution into a U light distribution, or the headlight switches over immediately from an L distribution into the U distribution and subsequently pivots to the new target position.

Figure 3:
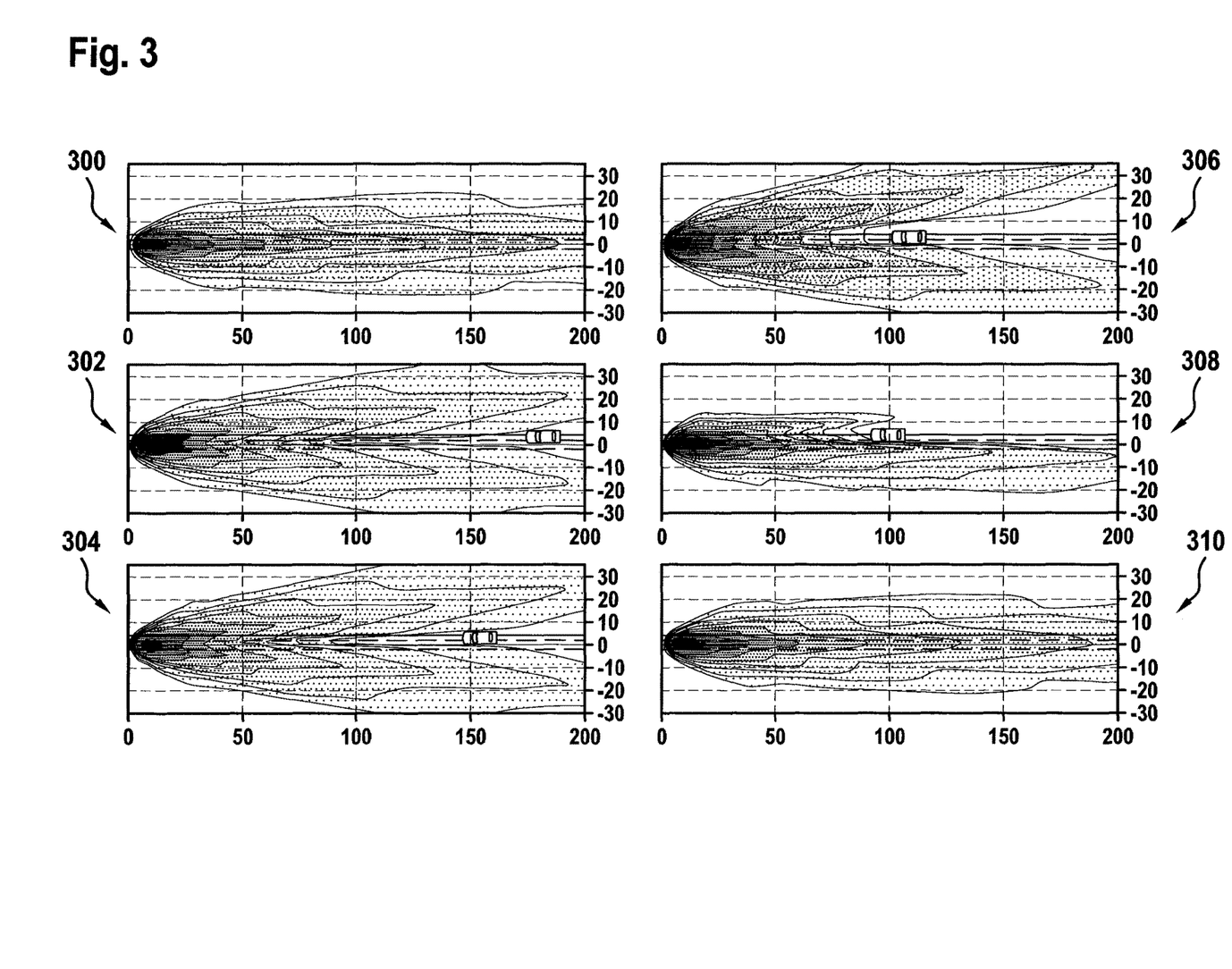
FIG. 3 shows diagrams of an example of one implementation option for glare-free high-beam light.

FIG. 3 shows diagrams of an example of one implementation option for glare-free high-beam light. Six diagrams show changes in the headlight light distribution over time in an encounter situation in a bird's-eye view. A diagram 300 shows an overlap of the illuminated areas of both headlights to form a central, closed light cone. Diagrams 302 through 306 show gradual outward pivoting of the headlights for positioning the U light distribution. A diagram 308 shows an example of dimming, i.e., generating the L shape of the light distribution, by dimming on one side when encountering another vehicle. Lastly, a diagram 310 shows the return to the centered high-beam light after the encounter, as similarly also illustrated in first diagram 300.

Figure 4:
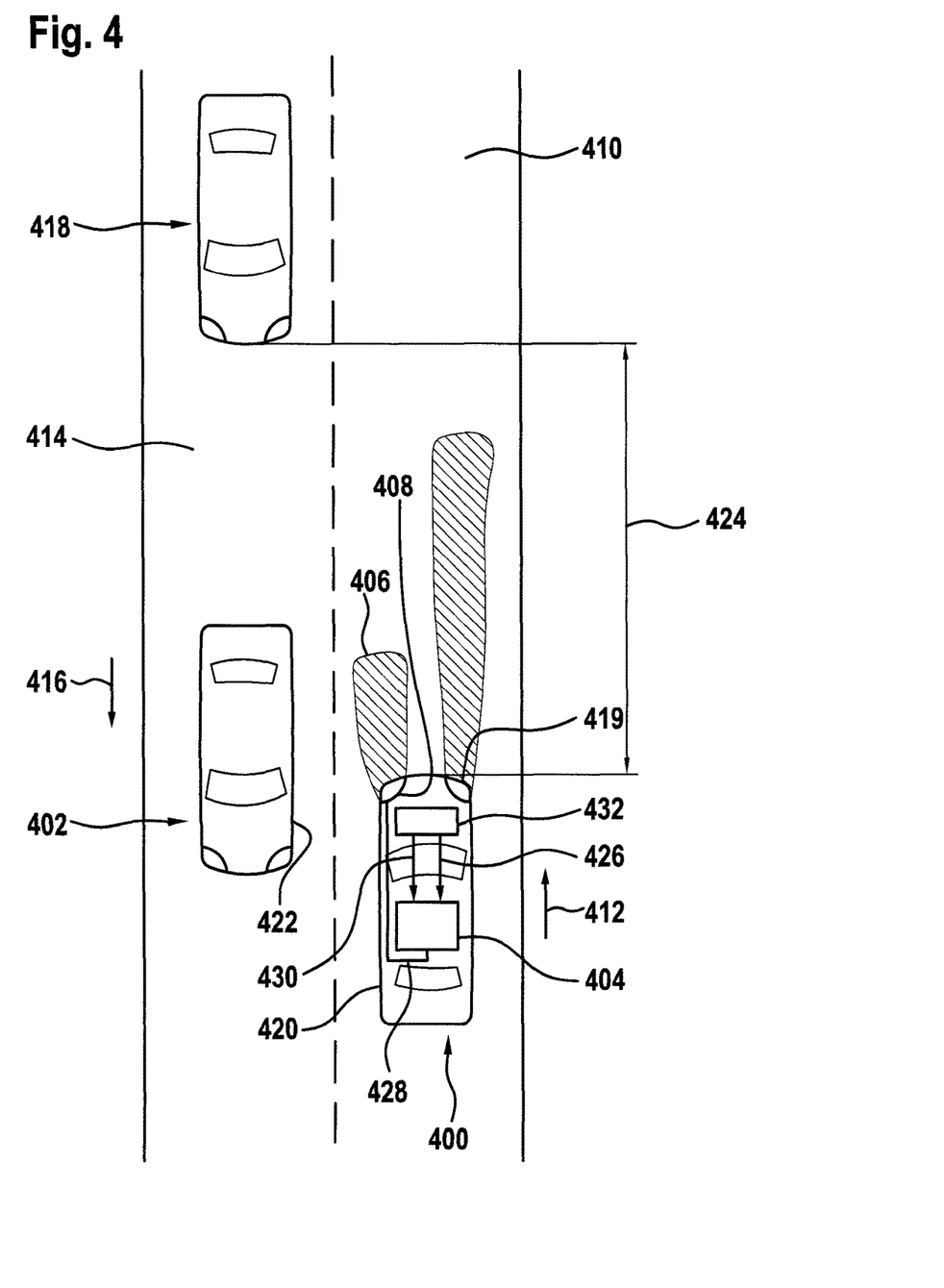
FIG. 4 shows a schematic illustration of a device for aligning an illuminated area of a headlight of a vehicle as a function of the surroundings of the vehicle, according to one exemplary embodiment of the present invention.

FIG. 4, with reference to a schematic illustration, shows an example of an encounter situation of vehicle 400 with another vehicle 402 in a bird's-eye view. Vehicle 400 is equipped with one exemplary embodiment of a device 404 for aligning an illuminated area 406 of a headlight 408 of vehicle 400.

In the example of a traffic scenario shown in FIG. 4, vehicle 400 is moving in a lane 410 of a roadway in a travel direction 412 denoted by an arrow in the illustration. Other vehicle 402 is moving in another adjacent lane 414 of the roadway in a further travel direction 416, opposite travel direction 412, once again denoted by an arrow in the illustration. An additional other vehicle 418 is driving behind other vehicle 402 in further lane 414 in further travel direction 416. In the exemplary embodiment shown in FIG. 4, vehicles 400, 402, 418 are passenger vehicles, each with two headlights. In the example shown, headlight 408 is the left headlight. Vehicle 400 also has a right headlight 419.

In the traffic scenario shown in FIG. 4, vehicle 400 and other vehicle 402 are instantaneously driving past one another. Stated another way, other vehicle 402 is instantaneously passing by vehicle 400. In the illustration in FIG. 4, this is shown in that a side area 420 of vehicle 400 facing other vehicle 402, and a further side area 422 of other vehicle 402 facing vehicle 400, are at least partially opposite one another. Side areas 420, 422 are understood here in each case to mean the entire lateral flank of the chassis of vehicle 400 and of other vehicle 402. A variable distance 424 to be measured in travel direction 412 of vehicle 400 is present between vehicle 400 and other vehicle 418.

Device 404 is configured for aligning illuminated area 406 of headlight 408 as a function of the surroundings of vehicle 400. For this purpose, device 404 receives, via a suitable interface, a piece of information 426 concerning a position of other vehicle 402 in relation to vehicle 400. Using information 426, device 404 provides a signal 428 to headlight 408 or to a motor for moving headlight 408 in order to move headlight 408 for aligning illuminated area 406 into a target position.

An objective of device 404 is considered to effectuate an adaptation of illuminated area 406 of headlight 408, via which blinding of oncoming traffic by headlight 408 may be prevented. In the traffic situation shown in FIG. 4, according to information 426, other vehicle 402 has already moved far enough past vehicle 400 that blinding of the driver of other vehicle 402 by headlight 408 may be ruled out. Instantaneously passing other vehicle 402 thus no longer plays a role with regard to determining the target position of headlight 408, and signal 428 for moving the headlight is provided even while other vehicle 402 is passing by vehicle 400. As a result of adjusting headlight 408 to the sought target position, additional other vehicle 418 is not blinded by headlight 408.

As shown by the illustration in FIG. 4, headlight 408 is already in a low-beam mode during provision of signal 428, due to other vehicle 402 which is passing by. This is apparent from the instantaneous L light distribution of the illumination of vehicle 400, which is clearly discernible in FIG. 4. Signal 428 is provided even before other vehicle 402 has completely passed vehicle 400, in order to adapt the illumination mode of headlight 408 in relation to additional other vehicle 418.

The low-beam mode may be understood here to mean an illumination mode in which blinding of a passing vehicle by the light distribution is avoided or reduced. The low-beam mode may also be understood to mean an illumination mode in which blinding of all other vehicles in predetermined surroundings around the vehicle, including the passing vehicle, is avoided or reduced, for example by decreasing the light intensity of the headlight in question.

Unlike the situation shown in FIG. 4, other vehicle 402 may also be a vehicle which is passed, i.e., overtaken, for example, by vehicle 400. In this case as well, on the basis of the provided information, device 404 is able to determine the correct target position for left headlight 408 and/or right headlight 419 of vehicle 400 and to output appropriate signal 428.

In the exemplary embodiment of device 404 shown in FIG. 4, the target position of headlight 408 is determined using a piece of information 430 concerning a position of additional other vehicle 418. According to information 430, the position of additional other vehicle 418 is defined as being to the left of vehicle 400. From this information it is deduced that additional other vehicle 418 is an oncoming vehicle. In the exemplary embodiment shown, signal 428 is thus also provided as a function of the knowledge that additional other vehicle 418 is an oncoming vehicle, and instantaneous distance 424 is above a predefined distance threshold value.

Unlike the situation shown in FIG. 4, additional other vehicle 418 may also be a preceding vehicle. Device 404 is configured for determining the target position for headlight 408 of vehicle 400, which then corresponds to the variables which are a function of this traffic situation.

In the exemplary embodiment shown in FIG. 4, information 426 concerning a position of other vehicle 402 and information 430 concerning a position of additional other vehicle 418 is provided by a surroundings sensor 432 of vehicle 400, in the present case an optical sensor of a camera system installed in vehicle 400. According to the exemplary embodiments, vehicle 400 may have even further surroundings sensors.

According to one exemplary embodiment which likewise is not shown, device 404 may be configured for providing the target position of headlight 408, based on surroundings data of surroundings sensor 432, when the surroundings of vehicle 400 are free of additional other vehicles. The surroundings data may be, for example, information concerning development of the roadway segment being traveled on at that moment, instantaneous weather conditions, etc.

Figure 4A:
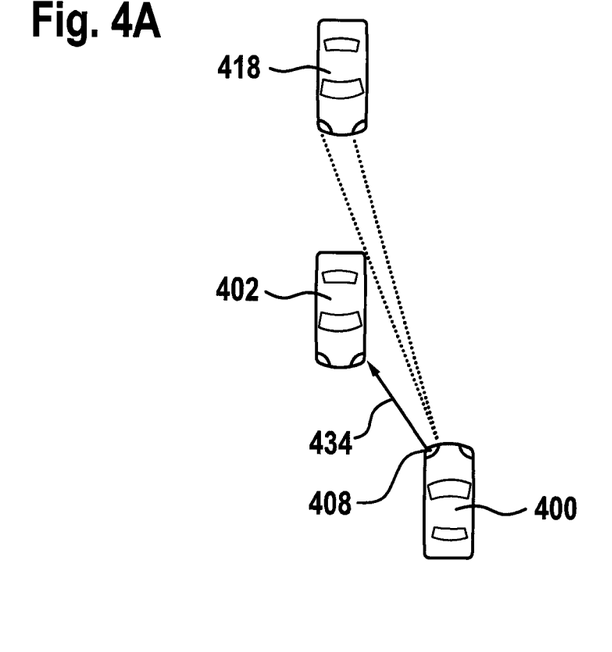
FIGS. 4A and 4B show one possible chronological advance to the traffic scenario shown in FIG. 4.
Figure 4B:
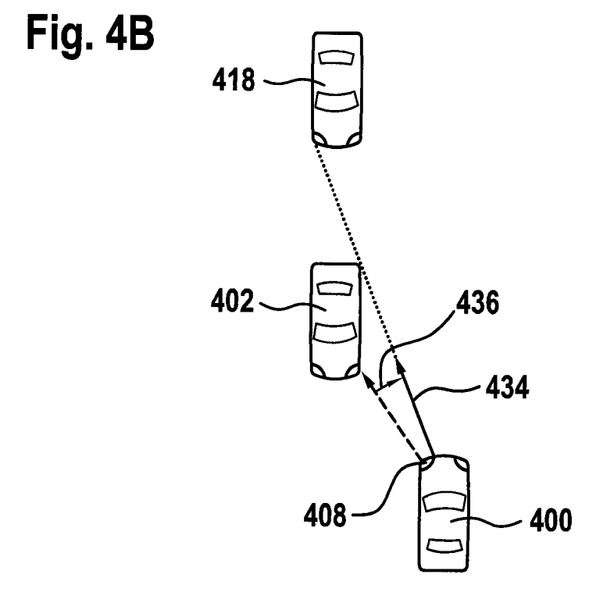

FIGS. 4A and 4B show one possible chronological advance to the traffic scenario shown in FIG. 4.

FIG. 4A shows the encounter situation for an example of a point in time in which other vehicle 402 is approaching vehicle 400, but has not yet passed by it. In order to not blind the driver of other vehicle 402, at least left headlight 408 of vehicle 400 is in a low-beam light mode or low-beam mode 434, as denoted by an arrow in the illustration.

FIG. 4B shows the movement of headlight 408 into the new target position, brought about by device 404, while other vehicle 402 has not yet reached or passed by vehicle 400. In the example shown in FIG. 4B, the new target position of left headlight 408 is achieved by pivoting headlight 408 to the right by a predetermined angle 436. The target position of headlight 408 is computed according to an instantaneous position of additional other vehicle 418. During the movement into the target position, left headlight 408 is still in low-beam mode 434.

Figure 4C:
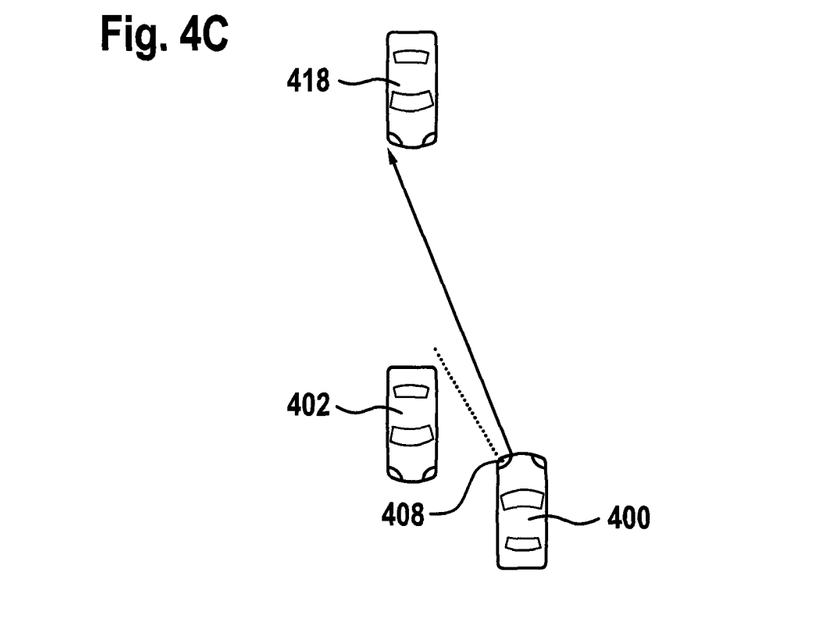
FIG. 4C shows the illumination mode of the left headlight at the point in time when the vehicle encounters the other vehicle, as illustrated in FIG. 4.

FIG. 4C shows the illumination mode of left headlight 408 at the point in time when vehicle 400 encounters other vehicle 402, as illustrated in FIG. 4. The new target position of headlight 408 has already been reached. The switchover of the light distribution of headlight 408 now takes place, since at this point in time of the encounter, there is no longer a risk of blinding the driver of other vehicle 402 by headlight 408.

Figure 5:
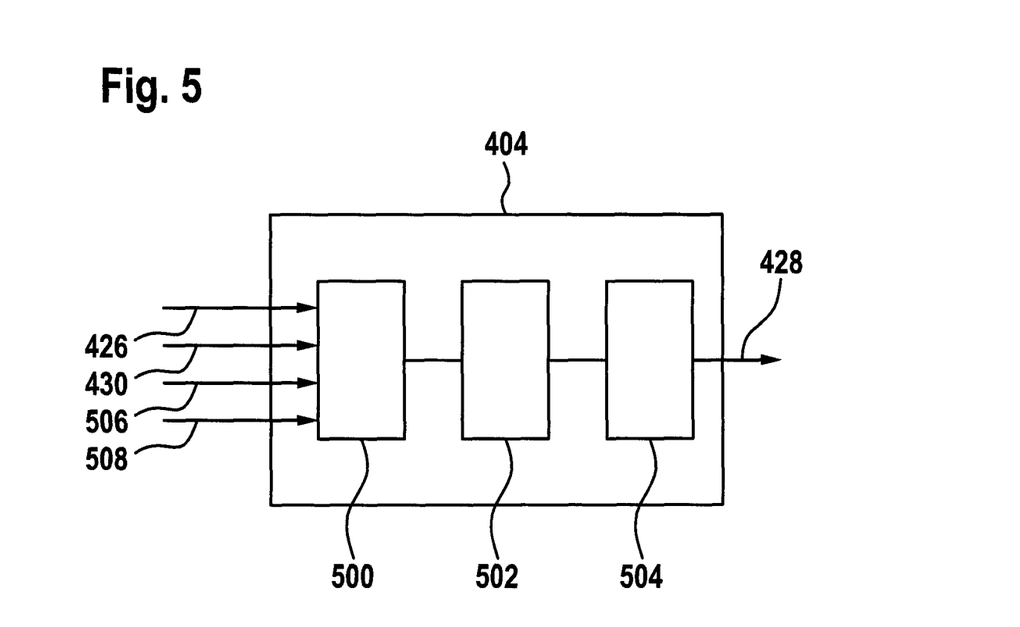
FIG. 5 shows a block diagram of a device for aligning an illuminated area of a headlight of a vehicle as a function of the surroundings of the vehicle, according to one exemplary embodiment of the present invention.

FIG. 5 shows a block diagram of one exemplary embodiment of device 404 for aligning an illuminated area of a headlight of a vehicle as a function of the surroundings of the vehicle. Device 404 in the example is the device shown in FIG. 4. Device 404 includes a classification device 500, a determination device 502, and a provision device 504.

Classification device 500 is configured for classifying the other vehicle, using information 426 concerning a position of the other vehicle, and classifying the additional other vehicle, using information 430 concerning a position of the additional other vehicle. Determination device 502 is configured for determining a target position of the headlight, with disregard of the other vehicle (i.e., independently of the other vehicle), when classification device 500 classifies the other vehicle as passing the vehicle or as being passed by the vehicle. Provision device 504 is configured for providing signal 428 for moving the headlight into the target position while the vehicle is being passed by the other vehicle or is passing the other vehicle.

According to one exemplary embodiment of device 404, classification device 500 is configured for classifying the additional other vehicle as an oncoming or preceding vehicle, using information 430, when a distance to be measured between the vehicle and the additional other vehicle in the travel direction of the vehicle is above a predefined distance threshold value. In addition, classification device 500 may be configured for deciding whether the additional other vehicle is an oncoming vehicle or a preceding vehicle. For this purpose, classification device 500 may access, for example, surroundings data 506 concerning the surroundings of the vehicle which are provided to classification device 500, for example, by a surroundings sensor of the vehicle.

According to another exemplary embodiment of device 404, the target position of the headlight may be determined even if no additional other vehicle is present. Correspondingly, determination device 502 is configured for determining the target position of the headlight, based on an evaluation of the surroundings of the vehicle using surroundings data 506. Alternatively or additionally, when there is no oncoming traffic, determination device 502 may be configured for determining the target position of the headlight, using a piece of information 508 concerning a trajectory of the vehicle.

FIGS. 4 and 5 show one implementation option of the concept provided here of the advantageous headlight alignment in the case of "vehicles driving past" and/or "vehicles passing" and/or passing maneuvers by the selection of a pivot angle of one or more headlights which is most advantageous for the future traffic situation. For example, the concept may be integrated into a CHC function of a vehicle.

Surroundings sensor 432 of vehicle 400, in the present case a camera system, recognizes other vehicles 402, 418, ascertains their position 426, 460 and distance 424, and their travel direction 416, for example by the color of light (headlight/taillight). Other road users 402, 418 are divided into various classes, for example "passing vehicle," in the present case other vehicle 402, and "vehicle far away," in the present case additional other vehicle 418. Previously ascertained data 424, 426, 430 are utilized for this purpose. For example, a "passing vehicle" in right-hand traffic may have the properties "distance less than threshold," "oncoming vehicle," "in left image area."

As soon as headlights 408, 419 have switched over from the U light distribution (around all vehicles) into an L light distribution, the new target position is ascertained based on the class division of the vehicles. Vehicles 402 which are being passed, and which accordingly have been sorted into an appropriate class, are not used for ascertaining the target position. The new target position is approached with an L light distribution while the passing vehicles 402 are still visible. When vehicles 402 have been passed, one of the regular control strategies may be utilized. For example, the light distribution may initially be switched over, and headlights 408, 419 may then be completely pivoted, or headlight 408, 419 may be initially pivoted, and the switchover may then be carried out. However, a difference in the importance for the illumination quality is marginal or not present here, and concerns only whether headlight 408, 419 has already arrived at the target position. A switchover from an L light distribution into the U light distribution may generally take place directly.

Other surroundings features or vehicle features may be utilized if no vehicles are present with the aid of which a target position may be ascertained. Thus, for example, based on vehicle trajectory 508, for example, the area at which the most light is required, or where the next vehicles are most likely to appear, may be ascertained. Vehicle trajectory 508 may be ascertained based on the proper motion or the travel path of vehicle 400, based on recognized lanes and/or navigation data. To save computing time for ascertaining trajectory 508, headlights 408, 419 alternatively may also be aligned straight ahead.

Figure 6:
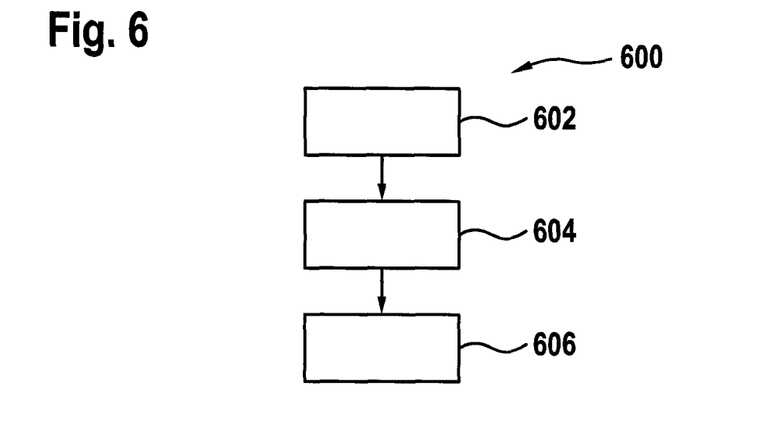
FIG. 6 shows a flow chart of a method for aligning an illuminated area of a headlight of a vehicle as a function of the surroundings of the vehicle, according to one exemplary embodiment of the present invention.

FIG. 6 shows a flow chart of one exemplary embodiment of a method 600 for aligning an illuminated area of a headlight of a vehicle as a function of the surroundings of the vehicle. Method 600 may be carried out in order to align or adapt the illuminated area of the headlight shown in FIG. 4 as a function of an encounter situation of the vehicle with other vehicles.

Another vehicle and/or at least one additional other vehicle in the surroundings of the vehicle is/are classified in a step 602 of classifying. The classification takes place using a piece of information concerning a position of the other vehicle and/or a piece of information concerning a position of the additional other vehicle in relation to the vehicle. A target position of the headlight is determined in a subsequent step 604 of determining. The determination takes place with disregard of the other vehicle (i.e., independently of the other vehicle) when the other vehicle has been classified as passing the vehicle or as being passed by the vehicle in step 602. A signal for moving the headlight into the target position is provided in a step 606 of providing while the vehicle is being passed by the other vehicle or is passing the other vehicle.

Figure 7:
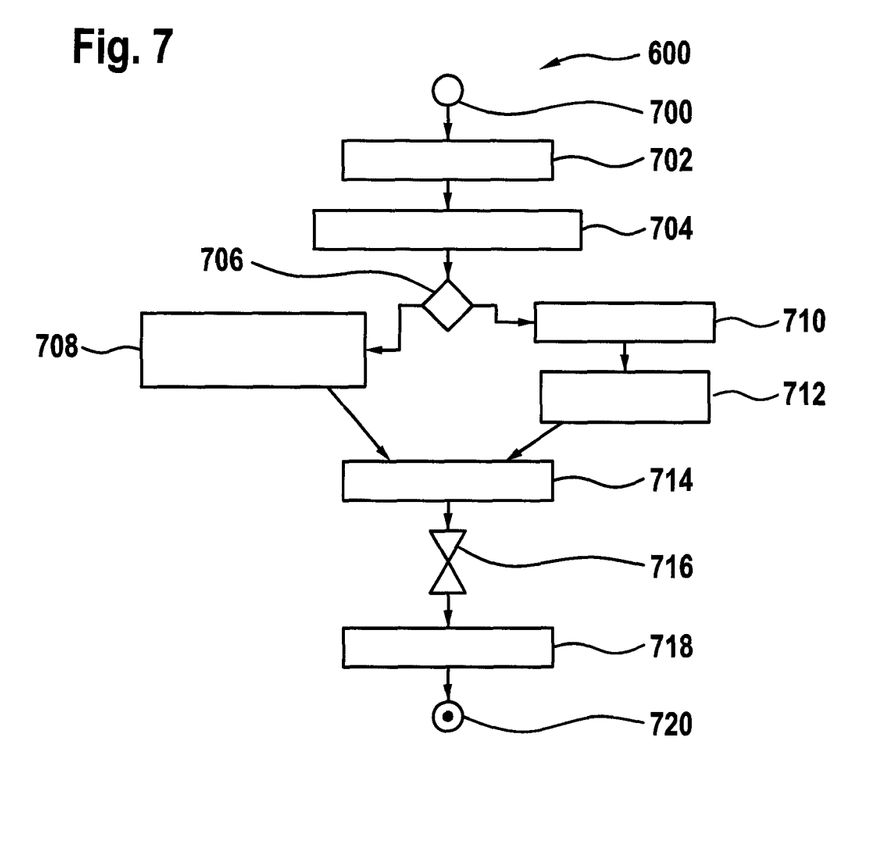
FIG. 7 shows a flow chart of a method for aligning an illuminated area of a headlight of a vehicle as a function of the surroundings of the vehicle, according to another exemplary embodiment of the present invention.

FIG. 7 shows a flow chart of method 600 according to another exemplary embodiment of the present invention. A symbol prior to the start of method 600 denotes a first light distribution 700 of a headlight of a vehicle. The vehicle surroundings are detected in a step 702 with the aid of surroundings sensors of the vehicle. Similarly as for step 602 of the exemplary embodiment of method 600 shown in FIG. 6, detected vehicles are divided into classes in a subsequent step 704 of classifying. A decision is subsequently made in a step 706 as to whether vehicles are present which should be encompassed in a dimming area of the headlight of the vehicle.

If "yes" is decided in step 706, a step 708 is subsequently carried out in which a target angle for the headlight is ascertained from vehicles which are not passing. If "no" is decided in step 706 of deciding whether vehicles are present which should be encompassed in a dimming area of the headlights of the vehicle, a step 710 of computing the trajectory of the vehicle is subsequently carried out. The target angle of the headlight is ascertained from the trajectory in a step 712. The target angle is approached in a step 714 following step 708 or step 712. A predefined waiting time 716 until the passing vehicles have completely passed the vehicle is subsequently awaited. Lastly, the light distribution of the headlight is switched over in a step 718. A symbol at the end of method 600 denotes a switched-over light distribution 720 of the headlight.

A passing vehicle, which is ignored for computing the new target angle in step 708, may be an oncoming vehicle, i.e., a typical "vehicle driving past," but may also be a vehicle that was originally a preceding vehicle, and which is passed or passed by in some other way by the host vehicle, for example due to turning.

The present invention may be advantageously applied in particular for vehicles driving past; however, in principle, use for other classes of passing vehicles is also possible and meaningful.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment.

Furthermore, the method steps provided here may be repeated, and carried out in a sequence different from that described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for aligning an illuminated area of a headlight of a vehicle as a function of the surroundings of the vehicle, the method comprising:
    classifying, by a classification device, at least one other vehicle in the surroundings of the vehicle as a function of a piece of information concerning a position of the other vehicle in relation to the vehicle;
    determining, by a determination device, a target position of the headlight based on the classification, the determination taking place independently of the other vehicle in response to classification of the other vehicle; by said classification device, as passing the vehicle or as being passed by the vehicle; and
    providing, by a provision device, a signal for moving the headlight into the target position while the vehicle is being passed by the other vehicle or is passing the other vehicle.

2. The method of claim 1, wherein the target position of the headlight is determined in the determining, using a piece of information concerning a position of an additional other vehicle, the additional other being classified as an oncoming vehicle or as a preceding vehicle in the classifying.

3. The method of claim 2, wherein the additional other is classified as an oncoming vehicle or a preceding vehicle in the classifying when a distance to be measured in the travel direction of the vehicle, between the vehicle and the additional other, is above a predefined distance threshold value.

4. The method of claim 2, wherein the additional other is classified as an oncoming vehicle in the classifying when its position in the travel direction of the vehicle is to the left of the vehicle in right-hand traffic, and/or is to the right of the vehicle in left-hand traffic, and is classified as a preceding vehicle when its position in the travel direction of the vehicle is in alignment with a position of the vehicle.

5. The method of claim 2, wherein the target position of the headlight is determined in the determining, based on an evaluation of the surroundings of the vehicle using surroundings data, when the surroundings are free of additional other vehicles.

6. The method of claim 5, further comprising:
    reading in the information concerning a position of the other vehicle and/or the information concerning a position of an additional other vehicle and/or the surroundings data from a surroundings sensor of the vehicle.

7. The method of claim 1, wherein the target position of the headlight is determined in the determining, using a piece of information concerning a trajectory of the vehicle, when the surroundings are free of additional other vehicles.

8. The method of claim 1, wherein the target position is determined to be in alignment with a center of the headlight in the determining when the surroundings are free of additional other vehicles.

9. The method of claim 1, wherein the target position of the headlight is determined in the determining when the headlight is in a low-beam mode in relation to the other vehicle.

10. A device for aligning an illuminated area of a headlight of a vehicle as a function of the surroundings of the vehicle, comprising:
    a classification device to classify at least one other vehicle in the surroundings of the vehicle as a function of a piece of information concerning a position of the other vehicle in relation to the vehicle;
    a determination device to determine a target position of the headlight based on the classification, the determination device being configured for carrying out the determination independently of the other vehicle in response to classification of the other vehicle, by said classification device, as passing the vehicle or as being passed by the vehicle; and
    a provision device to provide a signal for moving the headlight into the target position while the vehicle is being passed by the other vehicle or is passing the other vehicle.

11. A non-transitory computer readable medium having a computer program, which is executable by a processor, comprising:
    a program code arrangement having program code configured for aligning an illuminated area of a headlight of a vehicle as a function of the surroundings of the vehicle, by performing the following:

classifying, by a classification device, at least one other vehicle in the surroundings of the vehicle as a function of a piece of information concerning a position of the other vehicle in relation to the vehicle;

determining, by a determination device, a target position of the headlight based on the classification, the determination taking place independently of the other vehicle in response to classification of the other vehicle, by said classification device, as passing the vehicle or as being passed by the vehicle; and providing, by a provision device, a signal for moving the headlight into the target position while the vehicle is being passed by the other vehicle or is passing the other vehicle.

12. The computer readable medium of claim 11, wherein the target position of the headlight is determined in the determining, using a piece of information concerning a position of an additional other vehicle, the additional other being classified as an oncoming vehicle or as a preceding vehicle in the classifying.

13. The method of claim 1, wherein classifying the at least one other vehicle includes classifying the at least one other vehicle as passing the vehicle or as being passed by the vehicle by assigning the other vehicle to one of multiple classes.

14. The method of claim 1, further comprising:
moving the headlight based on the signal.

15. The method of claim 14, wherein the moving includes moving the headlight, using an electric motor.

16. The device of claim 10, further comprising:
an electric motor designed to move the headlight based on the signal.

17. The non-transitory computer readable medium of claim 13, wherein the program code is further for performing:
causing the moving of the headlight based on the signal.

18. The non-transitory computer readable medium of claim 17, wherein the causing the moving includes causing an electric motor to move the headlight based on the signal.

* * * * *